United States Patent [19]
Hayward

[11] 4,345,375
[45] Aug. 24, 1982

[54] CABLE TOOL

[76] Inventor: Robert D. Hayward, 6142 N. 18th Ave., Phoenix, Ariz. 85015

[21] Appl. No.: 155,442

[22] Filed: Jun. 2, 1980

[51] Int. Cl.³ .............................................. H02G 1/12
[52] U.S. Cl. .................................. 30/90.1; 29/566.4; 81/9.5 C
[58] Field of Search ..................... 29/564.6, 566.4; 30/90.1; 81/9.5 C

[56] References Cited
U.S. PATENT DOCUMENTS

| | | | |
|---|---|---|---|
| 3,620,104 | 11/1971 | Horrocks | 81/9.5 C |
| 3,659,483 | 5/1972 | Matthews | 81/9.5 C |
| 4,203,333 | 5/1980 | Campari | 30/90.1 X |
| 4,317,279 | 3/1982 | Smith et al. | 30/90.1 |

Primary Examiner—Z. R. Bilinsky
Attorney, Agent, or Firm—Don J. Flickinger

[57] ABSTRACT

A bore at the forward end of a rotatable body receives and guides a coaxial cable to a first cutter for removing a portion of the outer conductor and a second cutter for coring the dielectric. Detachably securable to the body is a third cutter for stripping away a portion of the protective jacket.

7 Claims, 7 Drawing Figures

CABLE TOOL

FIELD OF THE INVENTION

This invention relates to coaxial cable, such as the type used for signal transmission in a cable antenna television system.

In a further aspect, the present invention relates to tools used in connection with the installation or repair of a cable antenna television system.

More particularly, the instant invention concerns a tool for preparing a coaxial cable for union with a connector assembly.

DESCRIPTION OF THE PRIOR ART

Signals in a cable antenna television (CATV) system are transmitted by a coaxial cable having a center conductor and a tubular outer conductor. The center conductor is commonly fabricated of copper or copper-clad wire, while the outer conductor is usally aluminum, in the form of tube or foil. A dielectric, chosen from such material as polyethylene or styrene either solid or foamed, resides within the cable and maintains the center conductor in spaced relationship with the outer conductor. Protection for the cable is provided by a jacket, generally a black polyethylene coating or sheath, encasing the outer conductor.

Periodically spaced along the transmission cable are various fixed devices, such as couplers, directional taps and amplifiers. The devices are entered into the system by severing the cable and electrically and mechanically securing a connector assembly to each severed end of the cable. Special preparation of a portion of the end of the cable is required for attachment of the connector assembly. The devices are normally provided with a port for threadedly receiving the connector assembly.

Preparation of the severed end of the cable for union with the connector assembly, in accordance with prior art procedure, is an exceedingly time consuming and laborous task. The procedure commences by first removing a portion of the outer conductor. A conventional tubing cutter is positioned on the cable at a measured distance, typically one and thirteen sixteenths inches, from the severed end. Since it is not advisable to cut completely through the outer conductor, care must be taken to manipulate the tubing cutter only as necessary to provide an evenly indented score line.

Next, the terminal portion of the outer conductor is grasped with a perpendicularly positioned pair of pliers. With a twisting or oscillatory motion of the pliers, while flexing the cable, the outer conductor is broken, or sheared, along the score line. The pliers are then repositioned to pull the terminal portion of the outer conductor from the dielectric.

The dielectric material extending between the end of the outer conductor and the end of the center conductor is now removed. Utilizing a pocketknife, or available bladed tool, the material is severed on a plane with the end of the outer conductor. Subsequently, the material is shaved away by moving the blade in strokes generally parallel to the center conductor. While the center conductor must be adequately exposed for proper connection with the connector assembly, caution must be exercised to prevent blade damage to the center conductor.

Finally, it is necessary to remove the dielectric from within the outer conductor, for a specified distance, typically one inch, from the end thereof. This may be accomplished by a commercially available coring tool such as the one sold under the tradename "JERROLD". The primary feature of the manually rotatable tool is a core drill, having a forwardly directed cutting edge sized to be received within the outer conductor and having a central bore to receive the inner conductor.

Conventionally, a cable antenna television system is established as either an airborne or underground installation. In an airborne installation, the coaxial cable and the fixed devices are suspended from a wire rope or cable supported at an elevated position by spaced upright utility poles. It is common practice to position fixed devices at a distance of approximately eighteen inches from the pole. Accordingly, since a fixed device may extend for twelve inches, the cable is connected to the device at a distance of approximately twenty-eight inches from the adjacent pole.

Under field conditions, the pole is the usual support for a workman installing or servicing an airborne system. Preparation of a cable end in accordance with the previously described complex procedure by a workman extending his body and arms the required distance from the pole upon which he is supported, is indeed a cumbersome, tiring task.

Accordingly, it is an object of the present invention to remedy the deficiencies inherent in the prior art to which the instant invention pertains.

Another object of the invention is the provision of improved means for conditioning the end of coaxial cable for union of a selected assembly.

And another object of the invention is to provide a tool, especially adapted for preparing CATV cable for attachment to a connector assembly.

Yet another object of this invention is the provision of a tool which will remove the terminal portion of the outer conductor and form an end thereon at a determined distance from the end of the center conductor.

Still another object of the invention is to provide a tool for simultaneously coring the dielectric material while trimming the outer conductor.

Yet still another object of the present invention is the provision of a tool which may optionally strip away a preselected length of the jacket while performing the coring and the trimming functions.

And a further object of the invention is to provide a cable preparing tool having integral means for guiding and aligning the cable.

Still a further object of the instant invention is the provision of cable preparing tool which may be rotated and driven by manual or power means.

And still a further object of the invention is to provide a tool of the above type which is sufficiently compact and lightweight to be readily carried.

Yet a further object of the invention is the provision of a tool which is exceedingly simple to use without the requirement of special skills.

SUMMARY OF THE INVENTION

Briefly, to achieve the desired objects of the instant invention in accordance with a preferred embodiment thereof, first provided is a body having a longitudinal axis of rotation, a forward end and a rearward end. Guide means, proximate the forward end of the body, receive and axially guide the cable. Trimming means, aligned with the guide means, receives the cable and removes a portion of the outer conductor to form an end thereon at a selected distance from the end of the center conductor. Coring means, coaxial with the trimming means and sized to be received within the outer conductor, removes the dielectric material for a determined distance from the end of the outer conductor. An axial bore extending through the trimming means and the coring means receives the center conductor.

More specifically, the coring means includes a forwardly directed cutting edge spaced forwardly of the cutting edge of the trimming means. An opening, extending through the body, provides for escape of the removed outer conductor and dielectric material. Forward of the first guide means, which is sized to received the outer conductor, are second guide means sized to receive the protective jacket. Stripping means, integral with the second guide means, cuts and removes the jacket for a determined distance from the end of the outer conductor. The second guide means may be detachably securable to the body.

Extending from the rearward end of the body are means for attachment of a driving tool for rotating the cable preparation tool.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which.

DESCRIPTION OF THE PREFERRED EMBODIMENTS

Figure 1:
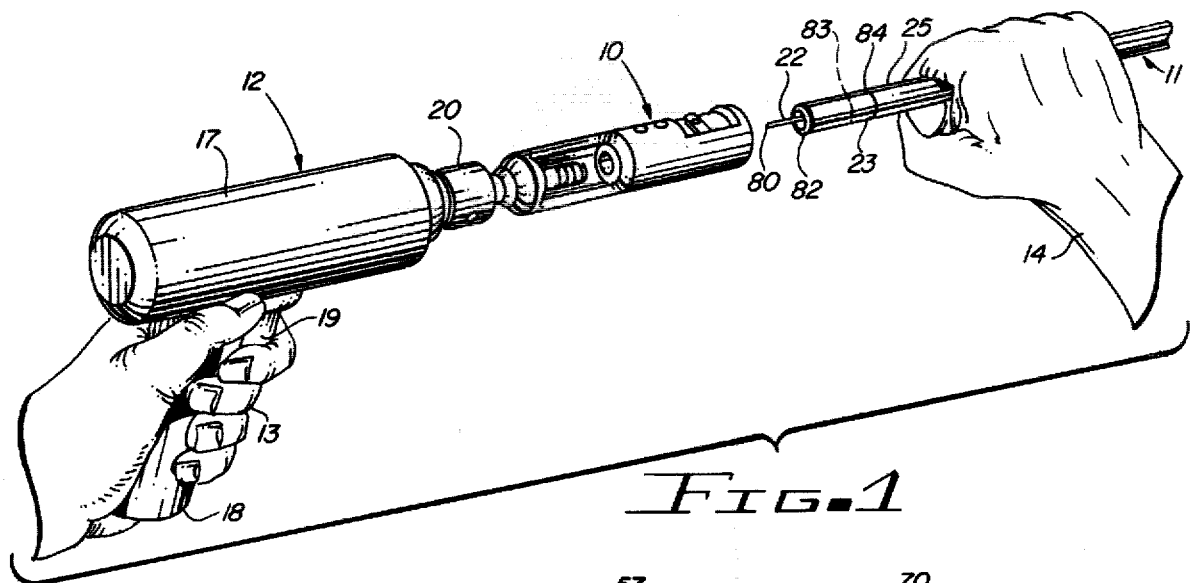
FIG. 1 is a perspective view of a tool embodying the principles of the instant invention as it would appear during use.

Turning now to the drawings in which like reference characters indicate corresponding elements throughout the several views, attention is first directed to FIG. 1 which shows a tool, generally designated by the reference character 10, and constructed in accordance with the teachings of the present invention, as it would appear when in use during the preparation of a coaxial cable, generally designated by the reference character 11, of the type typically employed for signal transmission in a cable antenna television system. Tool 10 is illustrated as being secured to an electric drill 12. The operation is being performed by a single workman, holding the drill 12 in the left-hand 13 and the cable 11 in the right-hand 14. Drill 12, typical of a variety of such devices commercially supplied by various manufacturers, includes housing 17, pistol-grip type handle 18, trigger-type switch 19 and chuck 20. An electric motor, not specifically herein illustrated, carried within housing 17 and responsive to switch 19 causes rotation of chuck 20. Electric drills of the immediate type are available in two basic configurations. One configuration, generally having an electric lead extending therefrom, requires attachment to an available source of electrical energy. The other configuration is self contained including a detachable, rechargeable battery pack.

Figure 7:
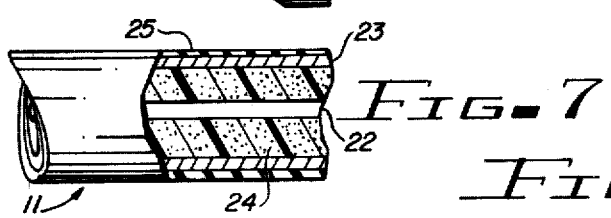
FIG. 7 is an elevation view of a fragmentary section, partly broken away, of a coaxial cable of the type commonly used for signal transmission in a cable antenna television system.

Cable 11, described in connection with FIG. 7 for purposes of reference, includes center conductor 22, commonly fabricated of copper or copper-clad wire, and coaxial tubular outer conductor 23, typically aluminum tube or foil. A dielectric 24, generally polyethylene or styrene either as a solid or as a foam, maintains center conductor 22 in the coaxial position with outer conductor 23. Other types of dielectrics, such as spaced apart solid polyethylene disks, are known in the art for providing the positioning and insulating functions. A jacket 25, such as a polyethylene coating encasing the outer conductor, provides a weather tight seal for protection of the cable.

Figure 2:
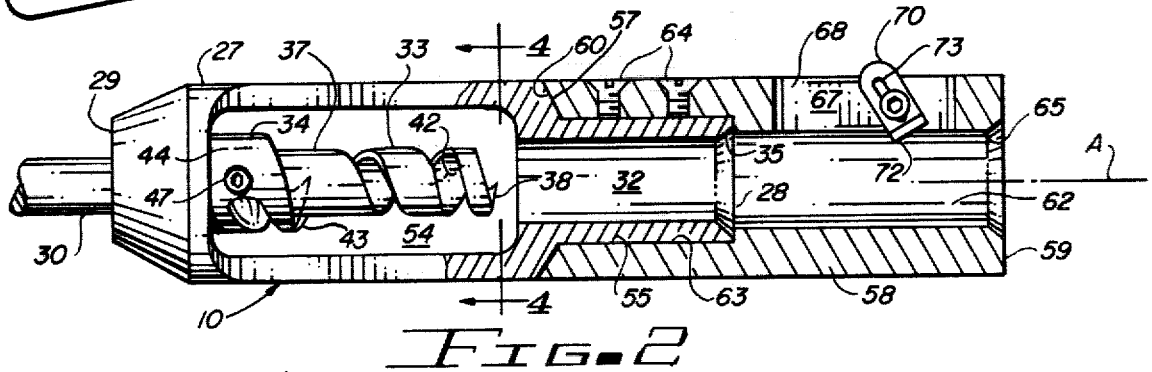
FIG. 2 is an enlarged side elevation view of the tool of FIG. 1, portions thereof being broken away for purposes of illustration.

Tool 10, as seen in FIG. 2, includes body 27, rotatable about a longitudinal axis represented by the broken line A, having forward end 28 and rearward end 29. Shank 30, extending axially from rearward end 29 provides an attachment for a rotating tool such as chuck 20 of electric drill 12. Axial bore 32, extending inwardly from forward end 28, aligns and guides cable 11 to the coring means 33 and the trimming means 34. Annular bevel 35, communicating between forward end 28 and bore 32, assists in directing cable 11 into bore 32.

Figure 4:
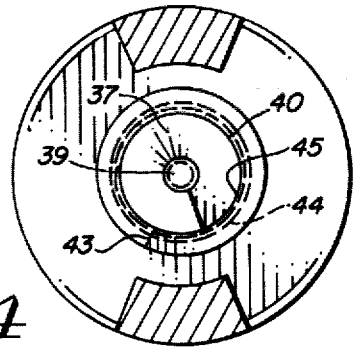
FIG. 4 is an enlarged vertical sectional view taken along the line 4—4 of FIG. 2.

Coring means 33 includes cylindrical shaft 37 axially aligned with bore 32 terminates with a forwardly directed cutting edge 38, as better viewed in FIG. 4. Although not specifically herein illustrated, but as will be appreciated by those skilled in the art, shaft 37 includes a rearward end embedded within or otherwise affixed to body 27. Coring means 33 receives coaxial cable 11 from bore 32 for the cutting away or removal of dielectric material 24. Accordingly, shaft 37 includes a central bore, or passage, 39 for receiving center conductor 22 and an outer cylindrical surface 40 sized to be received within outer conductor 23. Helical groove 42, extending along a length of shaft 37 from cutting edge 38 and communicating between bore 39 and outer surface 40, provides for flow of the cut away dielectric material 24 from within outer conductor 23.

Trimming means 34, which similarly receives cable 11 from bore 32, includes forwardly directed cutting edge 43 for trimming and removing a portion of outer conductor 23. In accordance with the immediately preferred embodiment of the invention, trimming means 34 includes cylindrical, or tubular, body portion 44 having bore 45 slidably receiving shank 37. Set screw 47 threadedly engaged within body portion 44 provides locking means for securing body portion 44 to shaft 37. Accordingly, the distance between trimming edge 38 and cutting edge 43 is selectively variable. Alternately, body portion 44 may comprise an integral, enlarged portion of shaft 37.

Figure 6:
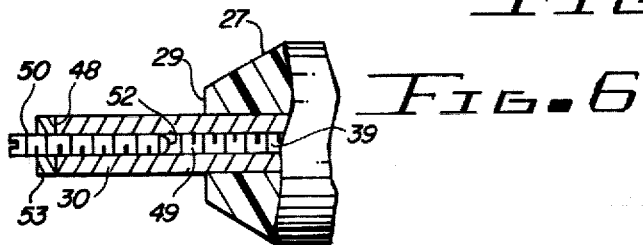
FIG. 6 is a fragmentary elevation view of the rearward end of the tool, taken from the left-hand end of the illustration of FIG. 2 and partially broken away for purposes of illustration.

Bore 39 within coring means 33 extends continuously through shank 30, as illustrated in FIG. 6. Extending inwardly from rearward end 48 of shank 30, is an internal thread 49 carried within bore 39. Set screw 50 having forwardly directed end 52 is matingly engaged with thread 49. End 52, selectively positionable along shank 30 in response to rotation and counterrotation of screw 50, as will be appreciated by those skilled in the art. Lock nut 53, in accordance with conventional practice, retains set screw 50 at the preset location.

Sections of body 27 are cut away in the region of coring means 33 and trimming means 34 to define an opening 54 extending through body 27 for the escape of the dielectric material and the outer conductor cut away and removed by the coring means 33 and the trimming means 34, respectively.

Stripping means for removing a portion of jacket 25 are carried at the forward end of body 10. For this purpose, body 10 is formed with a cylindrical section 55 extending from forward end 28 and terminating with outwardly directed annular shoulder 57. The stripping means includes sub-body 58 having forward end 59, rearward end 60, axial bore 62 and counterbore 63 extending inwardly from rearward end 60. Counterbore 63 is sized to receive cylindrical section 55 in locational fit. Set screws 64, being radial to longitudinal axis A and threadedly engaged within sub-body 58 in the area of counterbore 63, are employed in the conventional manner for detachably securing sub-body 58 to body 10.

Figure 3:
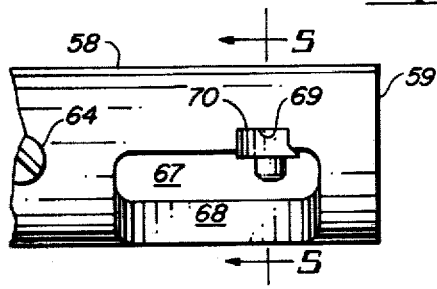
FIG. 3 is a top plan view of the forward end portion, taken from the right-hand end of the illustration of FIG. 2.
Figure 5:
FIG. 5 is an enlarged vertical sectional view taken along the line 5—5 of FIG. 3.

Bore 62 is sized to receive cable 11. Angularly beveled surface 65 communicating between forward end 59 and bore 62, guides and directs cable 11 into bore 62. An opening 67, defined by continuously side wall 68 extending between bore 62 and the exterior, is formed in sub-body 58. A groove 69, as seen with further reference to FIGS. 3 and 5, is formed in the side wall 68. A cutting tool 70, having inwardly directed cutting edge 72, is slidably disposed within groove 69. Cutting tool 70 is further provided with an elongate slot 73. Screw 74 passing through slot 73 is threadedly engaged with sub-body 58. Screw 74 functions as attachment and lock means and, in cooperation with slot 73, provides for the adjustment of the distance to which cutting edge 72 enters bore 62.

The foregoing described tool is used to prepare the terminal portion of a coaxial cable for installation, especially union with a cable connector assembly, as illustrated in FIG. 1. The terminal portion of cable 11 is defined as that section thereof adjacent the end having previously been severed by conventional technique within the art. After severing, the several components, center conductor 22, outer conductor 23, dielectric 24 and jacket 25, of cable 11 extend to the end. The cable is prepared by the single operation of inserting the severed end of cable 11 into tool 10 which is rotated as previously described. During the operation, the workman moves one hand in a direction toward the other hand feeding the cable into the tool. The operation continues until a stop, as will be described presently, is encountered.

Bore 62 is sized to rotatably and slidably receive jacket 25. Bore 32 is sized to rotatably and slidably receive outer conductor 23. Cutting edge 72 projects into bore 62 a distance corresponding to the wall thickness of jacket 25. Initially, upon entrance of cable 11 into bore 62, cutting edge 72 encounters and begins stripping away jacket 25 which is discharged through opening 68. Continuing the operation, outer conductor 23 passes through bore 32 whereupon cutting edge 38 encounters the dielectric material 24. As the dielectric material is removed by cutting edge 38, center conductor 22 enters bore 39 and shaft 37 enters outer conductor 23. Subsequently, outer conductor 23 encounters and is trimmed away by cutting edge 43. Scrap removed by cutting edges 38 and 43 is discharged through opening 54 in body 10. Finally, the end of center conductor 22 abuts the end 52 of set screw 50 which functions as stop means.

The terminal portion of the cable, now prepared, is withdrawn from the tool. The prepared terminal end is best described in connection with FIG. 1 which shows center conductor 22 having an end 80 which represents the initial severed end of cable 11. Outer conductor 23 is trimmed away to form an end 82 at a predetermined distance from end 80 of center conductor 22. Dielectric material 24 has been removed from center conductor 22 and cored out from within outer conductor 23 to an end represented by broken line 83 at a predetermined distance from the ends 80 and 82. Similarly, jacket 25 has been stripped away to an end 84 at a predetermined distance from the previously described ends. The terminal portion of cable 11, as shown, is ready for union with a conventional cable connector assembly.

Various changes and modifications to the embodiment of the invention herein chosen for purpose of illustration will readily occur to those skilled in the art. For example, cutting edges 38 and 43 may be integrally formed on a common shaft. The illustrated arrangement, however, provides that the distance between cutting edges 38 and 43 is adjustably variable, such as may be necessary to maintain the predetermined distance after portions of the cutting edges have been removed for purposes of sharpening. Similarly, shank 30 may be integral with shaft 37, the assembly being removably retained within housing 10 by a set screw or other conventional means. Accordingly, sharpening of edges 38 and 43 and replacement of a damaged component is facilitated. Obviously, for use in connection with cables not having an outer protective jacket, the stripping means is readily removable.

To the extent that such modifications and variations do not depart from the spirit of the invention, they are intended to be included within the scope thereof which is limited only by a fair interpretation of the following claims.

Having fully described and disclosed the present invention in such clear and concise terms as to enable those skilled in the art to understand and use the same, the invention claimed is:

1. A tool adapted to be rotatably driven for preparing a terminal portion of a coaxial cable for installation, which coaxial cable includes, a center conductor having an end, a coaxial tubular outer conductor, a dielectric material for maintaining the center conductor substantially coaxially within the outer conductor, and a jacket encasing the outer conductor, said tool comprising:

a body having a longitudinal axis of rotation, a forward end and a rearward end;

means forming a bore in said body extending rearwardly from said forward end;

cylindrical coring means having a forward end and a rearward end, wall means forming a central passage for receiving the center conductor therewithin, the rearward end of said coring means being affixed to the rearward end of the body so that the central passage is substantially symmetric with the longitudinal axis, stop means engaging the end of the center conductor to limit the maximum length of the center conductor received within said central passage, and cutting means positioned at the forward end of the coring means for removing the dielectric material between the outer conductor and the center conductor a first distance measured from the end of the center conductor when said end engages the stop means;

tubular trimming means for removing the outer conductor, means for mounting the trimming means on said coring means to remove the outer conductor a second distance measured from the end of the center conductor when said end engages the stop means;

jacket stripping means mounted on the body for removing the jacket a third distance from the end of the center conductor when said end engages the stop means;

said first, second and third distances being different from one another; and means for applying torque and a linear force to rotate the body about its axis of rotation and for applying a linear force to the body substantially along the axis of rotation.

2. A tool as defined in claim 1 in which the cylindrical coring means is provided with a helical groove for removing dielectric material from withing the outer conductor.

3. A tool as defined in claim 2 in which means forming openings in the body permit removed dielectric material, outer conductor, and jacket to escape from the body.

4. A tool as defined in claim 1 in which the means for applying torque and a linear force to the body includes a shank extending from the rearward end of the body, said shank adapted to be removably secured in a chuck of a hand-held drill.

5. A tool as defined in claim 4 in which the first distance is greater than the second and less than the third.

6. A tool as defined in claim 5 in which the means for mounting the trimming means on the coring means permits said second distance to be varied.

7. A tool as defined in claim 6 in which the stop means includes internal threads formed in the wall means forming the central passage, a set screw in threaded engagement with said internal threads, and a lock nut for retaining the set screw in a preset location.

* * * * *